(12) United States Patent
Chen

(10) Patent No.: US 11,513,980 B2
(45) Date of Patent: Nov. 29, 2022

(54) METHOD AND APPARATUS FOR PERFORMING ACCESS MANAGEMENT OF MEMORY DEVICE WITH AID OF UNIVERSAL ASYNCHRONOUS RECEIVER-TRANSMITTER CONNECTION

(71) Applicant: Silicon Motion, Inc., Hsinchu County (TW)

(72) Inventor: Chih-Yung Chen, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 17/399,005

(22) Filed: Aug. 10, 2021

(65) Prior Publication Data

US 2022/0229788 A1 Jul. 21, 2022

Related U.S. Application Data

(60) Provisional application No. 63/140,209, filed on Jan. 21, 2021.

(51) Int. Cl.
*G06F 13/16* (2006.01)
*G06F 12/14* (2006.01)
*G06F 12/02* (2006.01)

(52) U.S. Cl.
CPC ...... *G06F 13/1668* (2013.01); *G06F 12/0246* (2013.01); *G06F 12/1425* (2013.01); *G06F 13/1621* (2013.01)

(58) Field of Classification Search
None
See application file for complete search history.

(56) References Cited

U.S. PATENT DOCUMENTS

| 6,434,660 B1 * | 8/2002 | Lambert | G11C 16/20 703/22 |
|---|---|---|---|
| 6,842,264 B1 | 1/2005 | Leyva | |
| 8,484,380 B2 | 7/2013 | Alzamil | |

(Continued)

FOREIGN PATENT DOCUMENTS

| CN | 101136002 A | 3/2008 |
|---|---|---|
| CN | 102567196 A | 7/2012 |

(Continued)

*Primary Examiner* — Yaima Rigol
(74) *Attorney, Agent, or Firm* — Winston Hsu

(57) ABSTRACT

A method for performing access management of a memory device with aid of a Universal Asynchronous Receiver-Transmitter (UART) connection and associated apparatus are provided. The method may include: utilizing a UART of a memory controller within the memory device to receive a set of intermediate commands corresponding to a set of operating commands through the UART connection between the memory device and a host device, wherein before sending the set of intermediate commands to the controller through the UART connection, the host device converts the set of operating commands into the set of intermediate commands; converting the set of intermediate commands into the set of operating commands according to a command mapping table; and accessing a non-volatile (NV) memory within the memory device with the set of operating commands for the host device, and sending a response to the host device through the UART connection.

13 Claims, 8 Drawing Sheets

(56) References Cited

U.S. PATENT DOCUMENTS

| | | | | |
|---|---|---|---|---|
| 8,566,507 B2* | 10/2013 | Sprinkle | ............ | G06F 12/0246 |
| | | | | 711/E12.001 |
| 2016/0210455 A1* | 7/2016 | Lee | ................ | G06F 21/552 |
| 2019/0138476 A1* | 5/2019 | Lee | ................ | G06F 12/0246 |
| 2021/0270894 A1* | 9/2021 | Spica | ............ | G01R 31/318555 |
| 2021/0311887 A1* | 10/2021 | Hieb | ................ | G06F 3/0634 |
| 2022/0050787 A1* | 2/2022 | Siegel | ................ | G06F 12/145 |

FOREIGN PATENT DOCUMENTS

| | | |
|---|---|---|
| CN | 102662835 B | 10/2015 |
| CN | 110689915 A | 1/2020 |

\* cited by examiner

METHOD AND APPARATUS FOR PERFORMING ACCESS MANAGEMENT OF MEMORY DEVICE WITH AID OF UNIVERSAL ASYNCHRONOUS RECEIVER-TRANSMITTER CONNECTION

CROSS REFERENCE TO RELATED APPLICATIONS

This application claims the benefit of U.S. provisional application No. 63/140,209, which was filed on Jan. 21, 2021, and is included herein by reference.

BACKGROUND OF THE INVENTION

1. Field of the Invention

The present invention is related to memory control, and more particularly, to a method and apparatus for performing access management of a memory device with aid of a Universal Asynchronous Receiver-Transmitter (UART) connection.

2. Description of the Prior Art

A memory device may comprise Flash memory for storing data, and the management of accessing the Flash memory is complicated. During a preliminary phase (e.g. a design phase such as one of multiple pilot run phases) prior to a mass production phase of the memory device, it may be needed to perform some access testing operations on the memory device for developing one or more Flash memory accessing algorithms. Some problems may occur, however. Taking a Universal Flash Storage (UFS) device as an example of the memory device, in the preliminary phase of the UFS device, some communications features of the UFS device being designed may be incomplete (e.g. the UFS device cannot support UFS communications in this phase), which may make the testing schedule regarding the access testing operations be delayed. No proper solution can be found in the related art. Thus, a novel method and associated architecture are needed for solving the problems without introducing any side effect or in a way that is less likely to introduce a side effect.

SUMMARY OF THE INVENTION

It is therefore an objective of the present invention to provide a method and apparatus for performing access management of a memory device with aid of a Universal Asynchronous Receiver-Transmitter (UART) connection, in order to solve the above-mentioned problems.

At least one embodiment of the present invention provides a method for performing access management of a memory device with aid of a UART connection, where the method can be applied to a memory controller of the memory device. The memory device may comprise the memory controller and a non-volatile (NV) memory, and the NV memory may comprise at least one NV memory element (e.g. one or more NV memory elements). The method may comprise: utilizing a UART of the memory controller to receive a set of intermediate commands corresponding to a set of operating commands through the UART connection between the memory device and a host device, wherein before sending the set of intermediate commands to the controller through the UART connection, the host device converts the set of operating commands into the set of intermediate commands; converting the set of intermediate commands into the set of operating commands according to a command mapping table, wherein the command mapping table is positioned within the memory device; and accessing the NV memory with the set of operating commands for the host device, and sending a response to the host device through the UART connection.

In addition to the above method, the present invention also provides a memory device, and the memory device comprises a NV memory and a controller. The NV memory is arranged to store information, wherein the NV memory may comprise at least one NV memory element (e.g. one or more NV memory elements). The controller is coupled to the NV memory, and the controller is arranged to control operations of the memory device. In addition, the controller comprises a processing circuit that is arranged to control the controller according to a plurality of host commands from a host device, to allow the host device to access the NV memory through the controller. The controller further comprises a transmission interface circuit, and the transmission interface circuit is arranged to perform communications with the host device, and more particularly, comprises a UART, wherein the UART is equipped with a set of terminals for being respectively coupled to a set of terminals of a corresponding UART of the host device to form a UART connection between the memory device and the host device. For example, the controller utilizes the UART thereof to receive a set of intermediate commands corresponding to a set of operating commands through the UART connection, wherein before sending the set of intermediate commands to the controller through the UART connection, the host device converts the set of operating commands into the set of intermediate commands; the controller converts the set of intermediate commands into the set of operating commands according to a command mapping table, wherein the command mapping table is positioned within the memory device; and the controller accesses the NV memory with the set of operating commands for the host device, and sends a response to the host device through the UART connection.

According to some embodiments, an associated electronic device is also provided. The electronic device may comprise the above memory device, and may further comprise: the host device, coupled to the memory device. The host device may comprise: at least one processor, arranged for controlling operations of the host device; and a power supply circuit, coupled to the at least one processor, arranged for providing power to the at least one processor and the memory device. In addition, the memory device may provide the host device with storage space.

In addition to the above method, the present invention also provides a controller of a memory device, where the memory device comprises the controller and a NV memory. The NV memory may comprise at least one NV memory element (e.g. one or more NV memory elements). In addition, the controller comprises a processing circuit that is arranged to control the controller according to a plurality of host commands from a host device, to allow the host device to access the NV memory through the controller. The controller further comprises a transmission interface circuit, and the transmission interface circuit is arranged to perform communications with the host device, and more particularly, comprises a UART, wherein the UART is equipped with a set of terminals for being respectively coupled to a set of terminals of a corresponding UART of the host device to form a UART connection between the memory device and the host device. For example, the controller utilizes the UART thereof to receive a set of intermediate commands corresponding to a set of operating commands through the UART connection, wherein before sending the set of intermediate commands to the controller through the UART connection, the host device converts the set of operating commands into the set of intermediate commands; the controller converts the set of intermediate commands into the set of operating commands according to a command mapping table, wherein the command mapping table is positioned within the memory device; and the controller accesses the NV memory with the set of operating commands for the host device, and sends a response to the host device through the UART connection.

According to some embodiments, the memory controller of the memory device may control the operations of the memory device according to the method, and the memory device may be installed in the electronic device. The apparatus may comprise at least one portion (e.g. a portion or all) of the electronic device. For example, the apparatus may comprise the memory controller within the memory device. In another example, the apparatus may comprise the memory device. In yet another example, the apparatus may comprise the whole of the electronic device.

The present invention method and apparatus can guarantee that, in any phase of various phases of the memory device, the memory device can operate as requested by the host device, no matter whether the any phase represents a mass production phase or a preliminary phase (e.g. a design phase such as one of multiple pilot run phases) prior to the mass production phase. In addition, in the any phase, the host device and the memory device can communicate with each other through the UART connection according to a new protocol provided by the present invention. For example, in the preliminary phase, the memory device can access the NV memory for the host device as requested by the host device in various manners, no matter whether communications features of the memory device with respect to the host device are complete or not.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
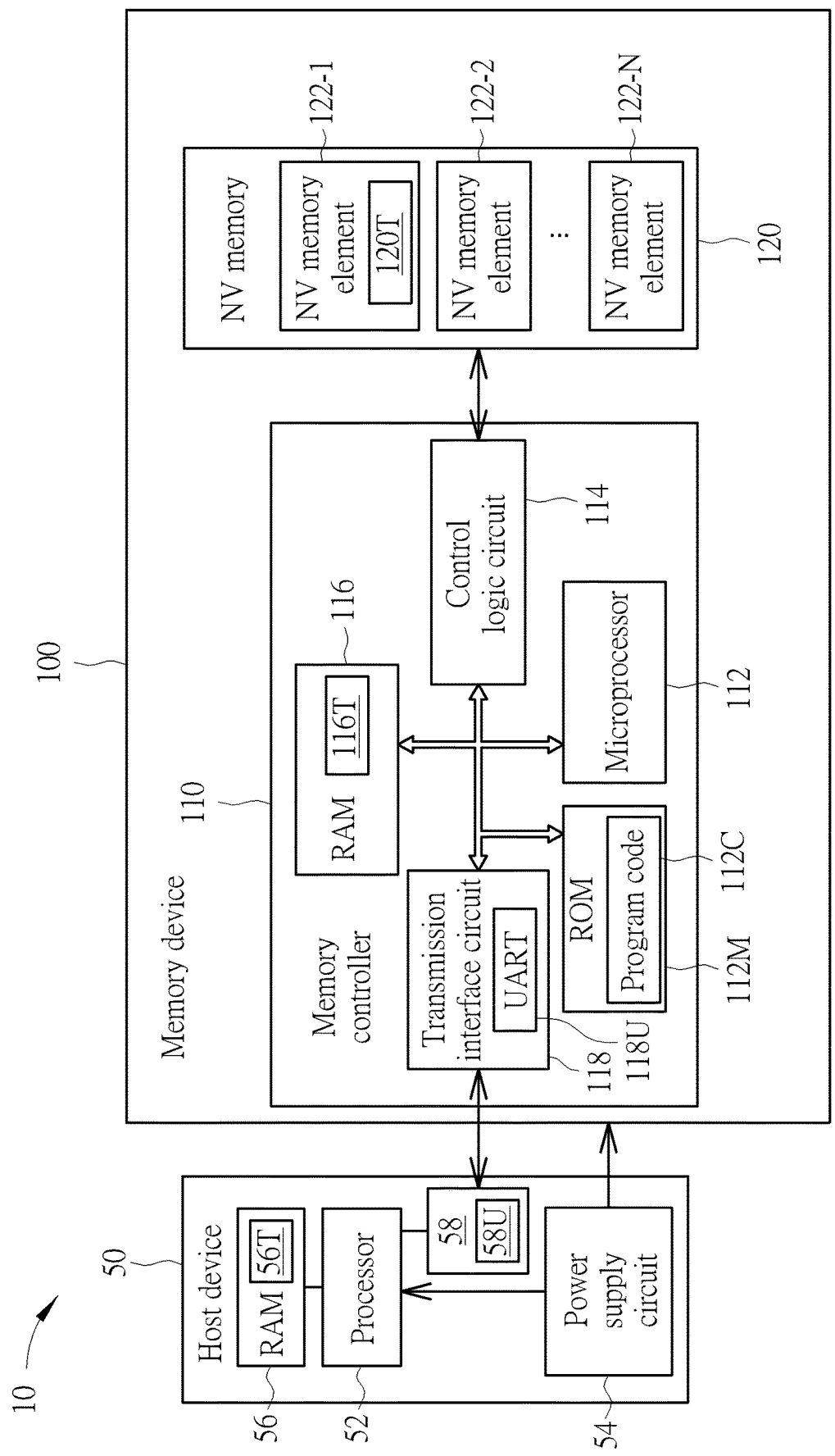
FIG. 1 is a diagram of an electronic device according to an embodiment of the present invention.

FIG. 1 is a diagram of an electronic device 10 according to an embodiment of the present invention, where the electronic device 10 may comprise a host device 50 and a memory device 100. The host device 50 may comprise at least one processor (e.g. one or more processors) which may be collectively referred to as the processor 52, a power supply circuit 54, at least one random access memory (RAM) (e.g. one or more RAMs, such as a dynamic RAM (DRAM), a static RAM (SRAM), etc.) which may be collectively referred to as the RAM 56), and a transmission interface circuit 58, where the processor 52 and the RAM 56 may be coupled to each other through a bus, and may be coupled to the power supply circuit 54 to obtain power. The processor 52 may be arranged to control operations of the host device 50, the power supply circuit 54 may be arranged to provide the processor 52, the RAM 56, the transmission interface circuit 58, and the memory device 100 with power, and output one or more driving voltages to the memory device 100, where the memory device 100 may provide the host device 50 with storage space, and may obtain the one or more driving voltages from the host device 50, to be the power of the memory device 100. Examples of the host device 50 may include, but are not limited to: a multifunctional mobile phone, a tablet computer, a wearable device, and a personal computer such as a desktop computer and a laptop computer. Examples of the memory device 100 may include, but are not limited to: a portable memory device (e.g. a memory card conforming to the SD/MMC, CF, MS or XD specification), a solid state drive (SSD), and various types of embedded memory devices (e.g. an embedded memory device conforming to the UFS or eMMC specification). According to this embodiment, the memory device 100 may comprise a controller such as a memory controller 110, and may further comprise a non-volatile (NV) memory 120, where the controller is arranged to access the NV memory 120, and the NV memory 120 is arranged to store information. The NV memory 120 may comprise at least one NV memory element (e.g. one or more NV memory elements), such as a plurality of NV memory elements 122-1, 122-2, ..., and 122-N, where "N" may represent a positive integer that is greater than one. For example, the NV memory 120 may be a flash memory, and the plurality of NV memory elements 122-1, 122-2, ..., and 122-N may be a plurality of flash memory chips or a plurality of flash memory dies, respectively, but the present invention is not limited thereto.

As shown in FIG. 1, the memory controller 110 may comprise a processing circuit such as a microprocessor 112, a storage unit such as a read only memory (ROM) 112M, a control logic circuit 114, a RAM 116 (which may be implemented by way of SRAM, for example), and a transmission interface circuit 118, where at least one portion (e.g. a portion or all) of the above components may be coupled to one another via a bus. The RAM 116 may be arranged to provide the memory controller 110 with internal storage space (for example, may temporarily store information), but the present invention is not limited thereto. In addition, the ROM 112M of this embodiment is arranged to store a program code 112C, and the microprocessor 112 is arranged to execute the program code 112C to control the access of the NV memory 120. Please note that, the program code 112C may also be stored in the RAM 116 or any type of memory. Additionally, the control logic circuit 114 may be arranged to control the NV memory 120. The control logic circuit 114 may comprise an error correction code (ECC) circuit (not shown in FIG. 1), which may perform ECC encoding and ECC decoding, to protect data, and/or perform error correction, and the transmission interface circuit 118 may conform to a specific communications specification (e.g. the Serial Advanced Technology Attachment (SATA) specification, Universal Serial Bus (USB) specification, Peripheral Component Interconnect Express (PCIE) specification, embedded Multi Media Card (eMMC) specification, or Universal Flash Storage (UFS) specification), and may perform communications according to the specific communications specification. For example, the transmission interface circuit 118 may perform communications with the transmission interface circuit 58 for the memory device 100 according to the specific communications specification, and the transmission interface circuit 58 may perform communications with the transmission interface circuit 118 for the host device 50 according to the specific communications specification.

In this embodiment, the host device 50 may transmit a plurality of host commands and corresponding logical addresses to the memory controller 110, to access the NV memory 120 within the memory device 100, indirectly. The memory controller 110 receives the plurality of host commands and the logical addresses, and translates the plurality of host commands into memory operating commands (which may be referred to as operating commands, for brevity), respectively, and further controls the NV memory 120 with the operating commands to perform reading or writing/programing upon the memory units or data pages of specific physical addresses within the NV memory 120, where the physical addresses correspond to the logical addresses. For example, the memory controller 110 may generate or update at least one logical-to-physical (H2F) address mapping table to manage the relationship between the physical addresses and the logical addresses. The NV memory 120 may store a global H2F address mapping table, for the memory controller 110 to control the memory device 100 to access data in the NV memory 120.

For better comprehension, the global H2F address mapping table may be located in a predetermined region within the NV memory element 122-1, such as a system region, but the present invention is not limited thereto. For example, the global H2F address mapping table may be divided into a plurality of local H2F address mapping tables, and the local H2F address mapping tables may be stored in one or more of the NV memory elements 122-1, 122-2, . . . , and 122-N, and more particularly, may be stored in the NV memory elements 122-1, 122-2, . . . , and 122-N, respectively. When there is a need, the memory controller 110 may load at least one portion (e.g. a portion or all) of the global H2F address mapping table into the RAM 116 or other memories. For example, the memory controller 110 may load a local H2F address mapping table of the plurality of local H2F address mapping tables into the RAM 116 to be a temporary H2F address mapping table therein, for accessing data in the NV memory 120 according to the local H2F address mapping table, but the present invention is not limited thereto.

In addition, the aforementioned at least one NV memory element (e.g. the one or more NV memory elements such as {122-1, 122-2, . . . , 122-N}) may comprise a plurality of blocks, where the minimum unit that the memory controller 110 may perform operations of erasing data on the NV memory 120 may be a block, and the minimum unit that the memory controller 110 may perform operations of writing data on the NV memory 120 may be a page, but the present invention is not limited thereto. For example, any NV memory element 122-n (where "n" may represent any integer in the interval [1, N]) within the NV memory elements 122-1, 122-2, . . . , and 122-N may comprise multiple blocks, and a block within the multiple blocks may comprise and record a specific number of pages, where the memory controller 110 may access a certain page of a certain block within the multiple blocks according to a block address and a page address. For another example, the NV memory element 122-n may comprise multiple planes, where a plane may comprise a set of blocks such as the aforementioned multiple blocks, and the memory controller 110 may specify a certain plane within the multiple planes according to a plane number, to access a certain page of a certain block of this plane. As the total number of blocks increases, the storage space of the NV memory 120 may become larger. Regarding manufacturing the NV memory 120, many technologies may be utilized, for example: a two-dimensional (2D)/planar NAND flash technology, which may arrange memory cells into a single layer; and a three-dimensional (3D) NAND flash technology, which may arrange the memory cells into a vertical stack of multiple layers. According to some embodiments, the NV memory 120 may be implemented as a 2D/planar NAND flash structure with the memory cells arranged in a single layer. According to some embodiments, the NV memory 120 may be implemented as a 3D NAND flash structure with multiple layers of memory cells stacked vertically. In this situation, the storage space of the NV memory 120 may become very large.

According to this embodiment, the transmission interface circuit 118 may comprise a Universal Asynchronous Receiver-Transmitter (UART) 118U, and the transmission interface circuit 58 may comprise a UART 58U, where any of the UARTs 58U and 118U may comprise sub-circuits such as a receiver, a transmitter, etc. When there is a need, a set of terminals {RX, TX, GND} of the UART 118U may be respectively coupled to a set of terminals {TX, RX, GND} of the UART 58U to form a UART connection between the memory device 100 (e.g. the memory controller 110 therein) and the host device 50, and the UART connection may comprise the connections between the set of terminals {RX, TX, GND} of the UART 118U and the set of terminals {TX, RX, GND} of the UART 58U.

Based on the architecture shown in FIG. 1, the host device 50 (e.g. the processor 52) and the memory device 100 (e.g. the memory controller 110) can communicate with each other through the UART connection according to a new protocol provided by the present invention. This protocol can be regarded as a UART protocol, and the associated communications performed by the host device 50 (e.g. the processor 52) and the memory device 100 (e.g. the memory controller 110) through the UART connection can be referred to as UART communications. According to this protocol, a single UART command (CMD) may comprise a command code and multiple arguments, and one or more arguments among the multiple arguments may carry one or more operating command representatives indicating one or more operating commands (e.g. one or more of the aforementioned operating commands regarding the NV memory 120). In addition, the host device 50 (e.g. the processor 52) can perform command mapping according to a command mapping table 56T to convert the one or more operating commands into the one or more operating command representatives, and the memory device 100 (e.g. the memory controller 110) can perform command mapping according to another command mapping table (e.g. a reverse command mapping table corresponding to a reverse command-mapping direction) such as any of command mapping tables 116T and 120T to convert the one or more operating command representatives into the one or more operating commands.

For example, the processor 52 can store a command mapping table in a certain storage device (e.g. a hard disk drive (HDD), etc.) within the host device 50 in advance, and load this command mapping table from this storage device to the RAM 56 to be the command mapping table 56T for use of command mapping during the UART communications. In addition, the memory controller 110 can store the command mapping table 120T in the NV memory 120 (e.g. the NV memory element 122-1) in advance, and load the command mapping table 120T from the NV memory 120 to the RAM 116 to be the command mapping table 116T for use of command mapping during the UART communications. When accessing the memory device 100 (e.g. writing data into the memory device 100, reading data from the memory device 100, etc.), the host device 50 (e.g. the processor 52) can convert a set of operating commands such as the one or more operating commands into a set of intermediate commands such as the one or more operating command representatives according to the command mapping table 56T, respectively, and send the set of intermediate commands to the memory device 100 (e.g. the memory controller 110 therein) through the UART connection, and more particularly, receive a response (e.g. acknowledgement (ACK), returned data, etc.) from the memory device 100 (e.g. the memory controller 110 therein) through the UART connection. When receiving the set of intermediate commands from the host device 50, the memory device 100 (e.g. the memory controller 110) can convert the set of intermediate commands such as the one or more operating command representatives into the set of operating commands such as the one or more operating commands according to the command mapping table 116T, respectively, and access the NV memory 120 with the set of operating commands for the host device 50, and more particularly, send the response (e.g. the ACK, the returned data, etc.) to the host device 50 through the UART connection.

For better comprehension, the command mapping table 120T may be located in the predetermined region within the NV memory element 122-1, such as the system region, but the present invention is not limited thereto. For example, the command mapping table 120T may be stored in another predetermined region within the NV memory element 122-1, such as another system region. For another example, the command mapping table 120T may be stored in any of the NV memory elements 122-1, 122-2, . . . , and 122-N.

Figure 2:
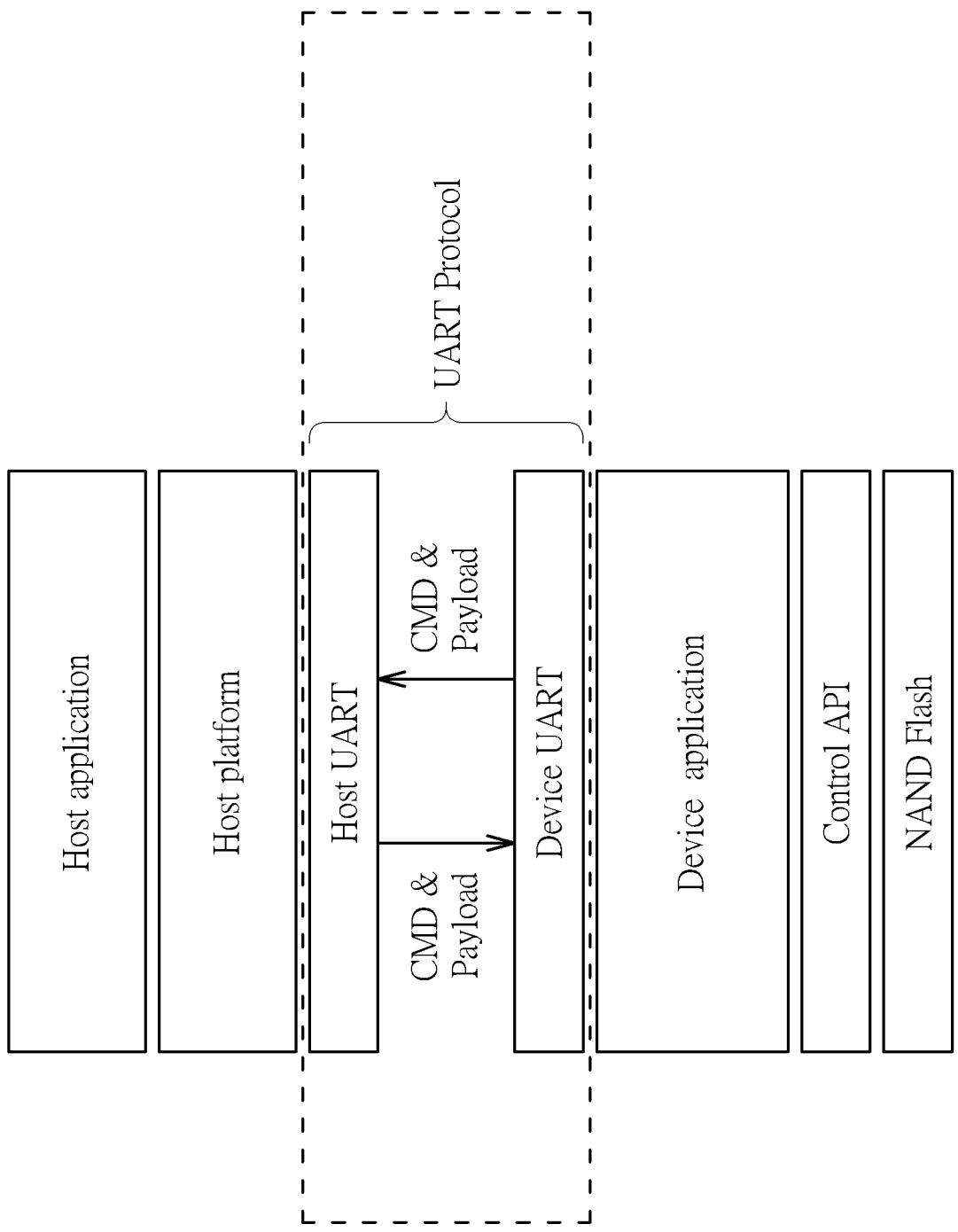
FIG. 2 illustrates a control scheme of a method for performing access management of a memory device with aid of a Universal Asynchronous Receiver-Transmitter (UART) connection according to an embodiment of the present invention.

FIG. 2 illustrates a control scheme of a method for performing access management of a memory device with aid of a UART connection according to an embodiment of the present invention, where the method can be applied to the architecture shown in FIG. 1, and more particularly, the host device 50 (e.g. the processor 52) and the memory device 100 (e.g. the memory controller 110). The host UART and the device UART in the central portion of the architecture shown in FIG. 2 may represent the UARTs 58U and 118U shown in FIG. 1, respectively, the host platform in the upper portion of the architecture shown in FIG. 2 may represent the processor 52, the RAM 56, etc. shown in FIG. 1, and the NAND Flash in the lower portion of the architecture shown in FIG. 2 may represent the NV memory 120 shown in FIG. 1. In addition, one or more program codes running on the processor 52 may comprise an operating system (OS), multiple drivers, multiple application programs, etc., and the application programs may comprise a host application such as the host application running on the host platform. Additionally, one or more program codes running on the microprocessor 112, such as the program code 112C loaded from the ROM 112M and/or an In-System Programming (ISP) code loaded from the NV memory 120, may comprise a control application program interface (API) and a device application, where the control API can perform hardware layer control on the hardware layer of the memory controller 110 for the device application.

Regarding the UART communications, the host device 50 (e.g. the processor 52) can send one or more first UART commands (labeled "CMD" at the downward arrow for brevity) to the memory device 100 during accessing the memory device 100, and more particularly, further send a payload (e.g. write data) to the memory device 100 during writing the memory device 100 (e.g. the one or more first UART commands may indicate a write request from the host device 50). In addition, the memory device 100 (e.g. the memory controller 110) can send one or more second UART commands (labeled "CMD" at the upward arrow for brevity) as the response to the host device 50, and more particularly, further send a payload (e.g. read data) to the host device 50 in a situation where the memory device 100 is operating in response to a read request from the host device 50 (e.g. the one or more first UART commands may indicate read request from the host device 50).

For example, under control of the host application, the host device 50 (e.g. the processor 52) can convert the set of operating commands such as the one or more operating commands into the set of intermediate commands such as the one or more operating command representatives according to the command mapping table 56T, respectively, and send the set of intermediate commands to the memory device 100 through the UART connection, and more particularly, receive the response (e.g. the ACK, the returned data, etc.) from the memory device 100 through the UART connection, for use of further processing. In another example, under control of the device application, the memory device 100 (e.g. the memory controller 110) can convert the set of intermediate commands such as the one or more operating command representatives into the set of operating commands such as the one or more operating commands according to the command mapping table 116T, respectively, and access the NV memory 120 with the set of operating commands for the host device 50, and more particularly, send the response (e.g. the ACK, the returned data, etc.) to the host device 50 through the UART connection. For brevity, similar descriptions for this embodiment are not repeated in detail here.

TABLE 1

| Byte | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| Basic Format | CMD Code | | Arg1 | | Arg2 | | | | Arg3 | | | | Arg4 | | Checksum | |

Table 1 illustrates a basic format of a single UART command used by the electronic device 10 according to an embodiment of the present invention, where a command packet of the UART command may comprise 16 bytes such as Byte 0 to Byte F, which has been named with hexadecimal values 0x0 to 0xF, respectively, but the present invention is not limited thereto. In some embodiments, the bytes in this basic format may be named with any type of values among some other types of values, such as decimal values 0 to 15.

The basic format of the single UART command may comprise multiple fields #1, #2, . . . , and #6 as listed below:
(1) field #1 (e.g. Byte 0 and Byte 1), for carrying the command code (labeled "CMD Code" for brevity);
(2) field #2 (e.g. Byte 2 and Byte 3), for carrying a first argument Arg1;
(3) field #3 (e.g. Byte 4 to Byte 7), for carrying a second argument Arg2;
(4) field #4 (e.g. Byte 8 to Byte B), for carrying a third argument Arg3;
(5) field #5 (e.g. Byte C and Byte D), for carrying a fourth argument Arg4; and
(6) field #6 (e.g. Byte E and Byte F), for carrying a checksum of Byte 0 to Byte D;
but the present invention is not limited thereto. In some embodiments, this basic format may vary. For example, the checksum in the field #6 may be replaced with any of other types of checking information, for guaranteeing correctness of the UART command. In another example, the number of arguments in this basic format may vary. In some examples, the number of fields in this basic format and/or the respective byte counts of the fields in this basic format may vary.

TABLE 2

| UART command | CMD Code | Arg1 | Arg2 | Arg3 | Arg4 | Checksum |
|---|---|---|---|---|---|---|
| CMD In | "CI" | Arg1 | Arg2 | Arg3 | Arg4 | Checksum |
| Data In | "DI" | Arg1 | Arg2 | Arg3 | CNT | Checksum |
| Data Out | "DO" | Arg1 | Arg2 | Arg3 | CNT | Checksum |
| Ready for CMD | "RC" | Arg1 | Arg2 | Arg3 | ERR Code | Checksum |
| Ready for Input | "RI" | Arg1 | Arg2 | Arg3 | ERR Code | Checksum |
| Ready for Output | "RO" | Arg1 | Arg2 | Arg3 | ERR Code | Checksum |

Table 2 illustrates some examples of the UART command used by the electronic device 10 according to an embodiment of the present invention, where the associated command (CMD) codes and the associated information (e.g. auxiliary information) such as the arguments Arg1, Arg2, Arg3, etc. are also illustrated for better comprehension. The first three examples of the UART command may comprise:
(1) lower-level-command-input command such as "CMD In" command (which can be expressed with the CMD code "CI"), for inputting a lower level command (e.g. an operating command representative indicating an operating command) into the memory device 100 from the host device 50;
(2) data-input command such as "Data In" command (which can be expressed with the CMD code "DI"), for inputting data into the memory device 100 from the host device 50, where the fourth argument Arg4 of this command may carry a transmission-unit count such as a payload count (labeled "CNT" for brevity) of the data to be input into the memory device 100 as requested by this command; and
(3) data-output command such as "Data Out" command (which can be expressed with the CMD code "DO"), for outputting data from the memory device 100 to the host device 50, where the fourth argument Arg4 of this command may carry a transmission-unit count such as a payload count (labeled "CNT" for brevity) of the data to be output from the memory device 100 as requested by this command; where these commands can be taken as examples of the one or more first UART commands.

In addition, the last three examples of the UART command may comprise:
(1) ready-for-command-receiving command such as "Ready for CMD" command (which can be expressed with the CMD code "RC"), for indicating that the memory device 100 is ready for receiving a UART command from the host device 50, where the fourth argument Arg4 of this command may carry an error (ERR) code (labeled "ERR Code" for brevity) when there is a need;
(2) ready-for-data-input command such as "Ready for Input" command (which can be expressed with the CMD code "RI"), for indicating that the memory device 100 is ready for inputting data from the host device 50, where the fourth argument Arg4 of this command may carry an error code (labeled "ERR Code" for brevity) when there is a need; and
(3) ready-for-data-output command such as "Ready for Output" command (which can be expressed with the CMD code "RO"), for indicating that the memory device 100 is ready for outputting data to the host device 50, where the fourth argument Arg4 of this command may carry an error code (labeled "ERR Code" for brevity) when there is a need; where these commands can be taken as examples of the one or more second UART commands, and can be regarded as responses (e.g. UART responses) from the memory device 100 to the host device 50.

The command codes may indicate different host-and-device interaction types, respectively, so the memory device 100 (e.g. the memory controller 110) can determining a corresponding host-and-device interaction type (e.g. a corresponding type among the type "CI" of the command code "CI", the type "DI" of the command code "DI" and the type "DO" of the command code "DO") when receiving one of the "CMD In" command, the "Data In" command and the "Data Out" command, and the host device 50 (e.g. the processor 52) can determining a corresponding host-and-device interaction type (e.g. a corresponding type among the type "RC" of the command code "RC", the type "RI" of the command code "RI" and the type "RO" of the command code "RO") when receiving one of the "Ready for CMD" command, the "Ready for Input" command and the "Ready for Output" command. In addition, a higher level mechanism (e.g. any of the host application and the device application) in the electronic device 10 can determine (e.g. define) the arguments Arg1, Arg2, Arg3, and Arg4 when there is a need. Regarding the data-input command such as "Data In" command, the transmission-unit count such as the payload count (labeled "CNT" for brevity) carried by the fourth argument Arg4 of this command may indicate how many 512-bytes (512B) payloads should be transferred with this command, where the total data amount of the data to be input into the memory device 100 is measured in unit of 512B (e.g. 512B per payload). Regarding the data-output command such as "Data Out" command, the transmission-unit count such as the payload count (labeled "CNT" for brevity) carried by the fourth argument Arg4 of this command may indicate how many 512B payloads should be transferred with this command, where the total data amount of the data to be output from the memory device 100 is measured in unit of 512B (e.g. 512B per payload). Regarding any of the responses (e.g. the UART responses) from the memory device 100 to the host device 50, the error code (labeled "ERR Code" for brevity) may represent a fail code, and more particularly, may indicate an error such as data checksum failure, command execution failure, etc.

Figure 3:
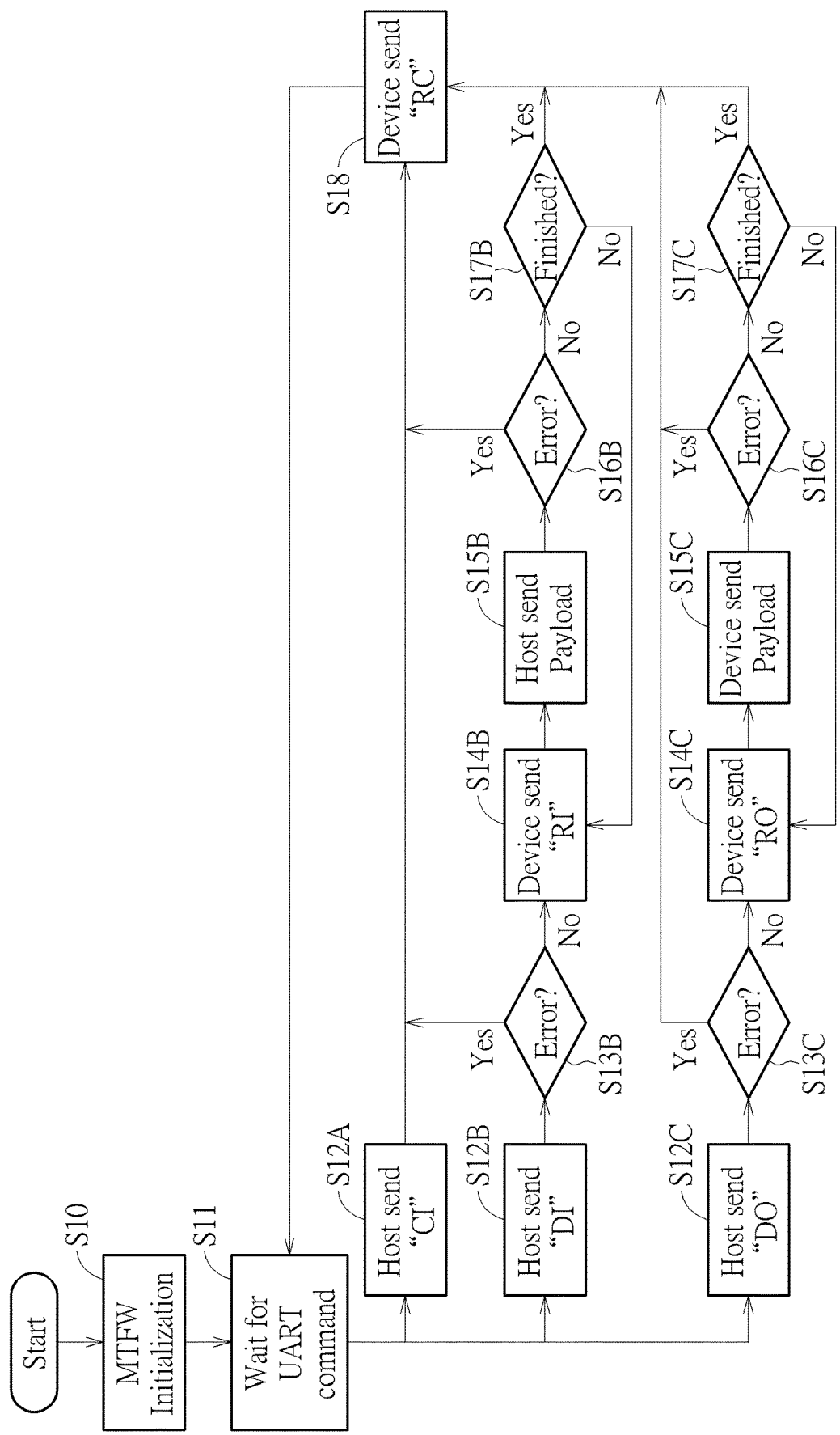
FIG. 3 illustrates a working flow of the method for performing access management of the memory device with aid of the UART connection according to an embodiment of the present invention.

FIG. 3 illustrates a working flow of the method according to an embodiment of the present invention. For example, the host device 50 and the memory device 100 can be regarded as the host side and the device side, respectively, and therefore can be respectively labeled "Host" and "Device" in some associated steps of this working flow for brevity. In addition, the device application can be implemented by way of a memory test firmware (MTFW) code, where the associated initialization of the MTFW code can be regarded as MTFW initialization, but the present invention is not limited thereto.

In Step S10, the memory device 100 (e.g. the memory controller 110) can perform the MTFW initialization.

In Step S11, the memory device 100 (e.g. the memory controller 110) can wait for a UART command from the host device 50.

In Step S12A, the host device 50 (e.g. the processor 52) can send the lower-level-command-input command such as the "CMD In" command (labeled "CI" for brevity) to the memory device 100 through the UART connection.

In Step S12B, the host device 50 (e.g. the processor 52) can send the data-input command such as the "Data In" command (labeled "DI" for brevity) to the memory device 100 through the UART connection, where the data-input command such as the "Data In" command may carry the payload count thereof.

In Step S12C, the host device 50 (e.g. the processor 52) can send the data-output command such as the "Data Out" command (labeled "DO" for brevity) to the memory device 100 through the UART connection, where the data-output command such as the "Data Out" command may carry the payload count thereof.

In Step S13B, the memory device 100 (e.g. the memory controller 110) can check whether any error occurs. If Yes, Step S18 is entered; if No, Step S14B is entered.

In Step S13C, the memory device 100 (e.g. the memory controller 110) can check whether any error occurs. If Yes, Step S18 is entered; if No, Step S14C is entered.

In Step S14B, the memory device 100 (e.g. the memory controller 110) can send the ready-for-data-input command such as the "Ready for Input" command (labeled "RI" for brevity) to the host device 50 through the UART connection.

In Step S14C, the memory device 100 (e.g. the memory controller 110) can send the ready-for-data-output command such as the "Ready for Output" command (labeled "RO" for brevity) to the host device 50 through the UART connection.

In Step S15B, the host device 50 (e.g. the processor 52) can send an associated payload to the memory device 100.

In Step S15C, the memory device 100 (e.g. the memory controller 110) can send an associated payload to the host device 50.

In Step S16B, the memory device 100 (e.g. the memory controller 110) can check whether any error occurs. If Yes, Step S18 is entered; if No, Step S17B is entered.

In Step S16C, the memory device 100 (e.g. the memory controller 110) can check whether any error occurs. If Yes, Step S18 is entered; if No, Step S17C is entered.

In Step S17B, the memory device 100 (e.g. the memory controller 110) can check whether payload transmission is finished. If Yes, Step S18 is entered; if No, Step S14B is entered.

In Step S17C, the memory device 100 (e.g. the memory controller 110) can check whether payload transmission is finished. If Yes, Step S18 is entered; if No, Step S14C is entered.

In Step S18, the memory device 100 (e.g. the memory controller 110) can send the ready-for-command-receiving command such as the "Ready for CMD" command (labeled "RC" for brevity) to the host device 50 through the UART connection.

For better comprehension, the method may be illustrated with the working flow shown in FIG. 3, but the present invention is not limited thereto. According to some embodiments, one or more steps may be added, deleted, or changed in the working flow shown in FIG. 3.

TABLE 3

| Byte | 0 | 1 | ... | 511 | 512 | 513 |
|---|---|---|---|---|---|---|
| Basic Format | | Payload | | | Checksum | |

Table 3 illustrates a basic format of a single UART payload used by the electronic device 10 according to an embodiment of the present invention, where a payload packet of the UART payload may comprise 514 bytes such as Byte 0 to Byte 513, which has been named with decimal values 0 to 513, respectively, but the present invention is not limited thereto. In some embodiments, the bytes in this basic format may be named with any type of values among some other types of values, such as hexadecimal values 0x0000 to 0x0201.

The basic format of the single UART payload may comprise multiple fields #1 and #2 as listed below:
(1) field #1 (e.g. Byte 0 to Byte 511), for carrying the payload (e.g. the payload mentioned in any of Steps S15B and S15C); and
(2) field #2 (e.g. Byte 512 and Byte 513), for carrying a checksum of Byte 0 to Byte 511;
but the present invention is not limited thereto. In some embodiments, this basic format may vary. For example, the checksum in the field #2 may be replaced with any of other types of checking information, for guaranteeing correctness of the UART payload. In some examples, the number of fields in this basic format and/or the respective byte counts of the fields in this basic format may vary.

Figure 4:
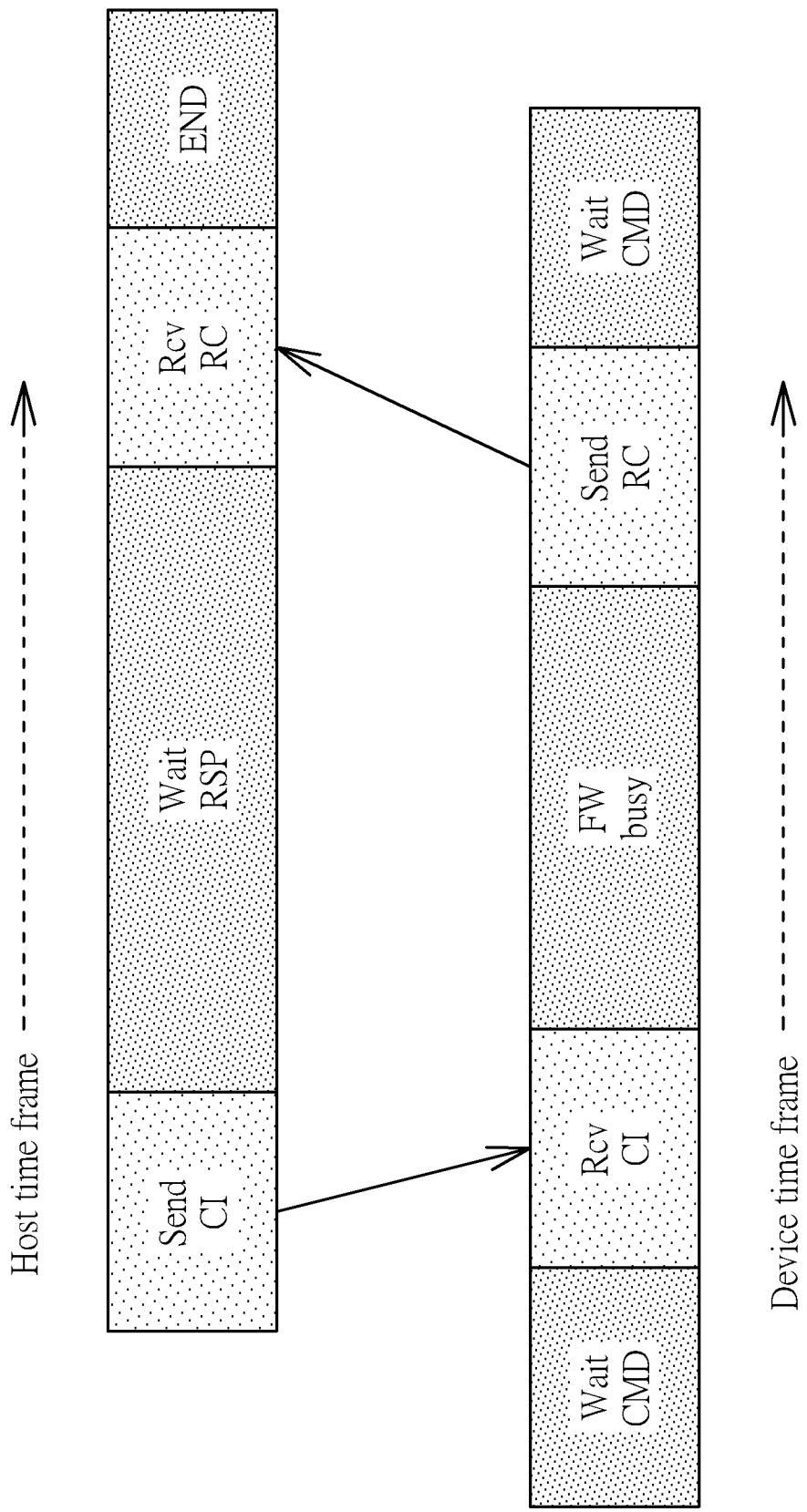
FIG. 4 illustrates an example of associated timing charts of the host device 50 and the memory device 100 according to an embodiment of the present invention.

FIG. 4 illustrates an example of associated timing charts of the host device 50 and the memory device 100 according to an embodiment of the present invention. For example, the host device 50 and the memory device 100 can be regarded as the host side and the device side, respectively, and therefore can be respectively labeled "Host" and "Device" in FIG. 4 for brevity. For better comprehension, assume that a first UART command that the host device 50 sends to the memory device 100 through the UART connection is the lower-level-command-input command such as the "CMD In" command (labeled "CI" for brevity), and that the associated response (e.g. a second UART command) that the memory device 100 sends to the host device 50 is the ready-for-command-receiving command such as the "Ready for CMD" command (labeled "RC" for brevity), but the present invention is not limited thereto. In some embodiments, the first UART command and the associated response (e.g. the second UART command) may vary.

Regarding the host side time frame (labeled "Host time frame" for brevity) of the host device 50, the host device 50 (e.g. the processor 52) can send the first UART command such as the "CMD In" command (labeled "CI" for brevity) to the memory device 100 through the UART connection, and then wait for the response (RSP) (e.g. the second UART command) from the memory device 100, and receive (Rcv) the response such as the "Ready for CMD" command (labeled "RC" for brevity) from the memory device 100 through the UART connection. Afterward, the procedure regarding this first UART command and this second UART command at the host side may come to the end. Regarding the device side time frame (labeled "Device time frame" for brevity) of the memory device 100, the memory device 100 (e.g. the memory controller 110) can wait for the first UART command (labeled "CMD" for brevity) from the host device 50, and receive (Rcv) the first UART command such as the "CMD In" command (labeled "CI" for brevity) from the host device 50 through the UART connection, and then the microprocessor 112 running the device application such as a firmware (FW) code (e.g. the MTFW code) can operate in response to the first UART command and therefore become busy (labeled "FW busy" for brevity). Afterward, the memory device 100 (e.g. the memory controller 110) can send the response (RSP) such as the "Ready for CMD" command (labeled "RC" for brevity) to the host device 50 through the UART connection, and then wait for another first UART command (labeled "CMD" for brevity) from the host device 50.

Based on the above embodiments, the basic architecture of the new protocol has been established. In any phase of various phases of the memory device 100, the memory device 100 (e.g. the memory controller 110) can operate as requested by the host device 50, no matter whether the any phase represents a mass production phase or a preliminary phase (e.g. a design phase such as one of multiple pilot run phases) prior to the mass production phase. In addition, in the any phase, the host device 50 (e.g. the processor 52) and the memory device 100 (e.g. the memory controller 110) can communicate with each other through the UART connection according to the new protocol provided by the present invention. For example, in the preliminary phase, the memory device 100 (e.g. the memory controller 110) can access the NV memory 120 for the host device 50 as requested by the host device 50 in various manners, no matter whether communications features of the memory device 100 with respect to the host device 50 are complete or not.

As the one or more program codes running on the microprocessor 112 can be implemented by way of the ISP code loaded from the NV memory 120, the manufacturer of the memory controller 110 and/or the manufacturer of the memory device 100 can utilize the UART communications between the host device 50 (e.g. the processor 52) and the memory device 100 (e.g. the memory controller 110) to update the ISP code in the NV memory 120, and therefore update the control API and/or the device application within the one or more program codes. Therefore, the new protocol provided by the present invention is really helpful on the associated works of the manufacturer(s) mentioned above in the any phase of the memory device 100.

TABLE 4

| CMD | Arg1 |
|---|---|
| CMD1 | 0x0000 |
| CMD2 | 0x0001 |
| CMD3 | 0x0010 |

TABLE 4-continued

| CMD | Arg1 |
|---|---|
| CMD4 | 0x0011 |
| CMD5 | 0x0100 |
| ... | ... |

Table 4 illustrates an example of command mapping according to an embodiment of the present invention, where the symbol " . . . " indicates that some table contents of Table 4 may be omitted for brevity. The host device 50 (e.g. the processor 52) can perform command mapping according to the command mapping table 56T to convert the one or more operating commands (e.g. one or more of the operating commands CMD1, CMD2, CMD3, CMD4, CMD5, etc. in Table 4) into the one or more operating command representatives (e.g. one or more of the operating command representatives 0x0000, 0x0001, 0x0010, 0x0011, 0x0100, etc. in Table 4), and the memory device 100 (e.g. the memory controller 110) can perform command mapping according to its own command mapping table such as any of command mapping tables 116T and 120T to convert the one or more operating command representatives (e.g. the one or more of the operating command representatives 0x0000, 0x0001, 0x0010, 0x0011, 0x0100, etc. in Table 4) into the one or more operating commands (e.g. the one or more of the operating commands CMD1, CMD2, CMD3, CMD4, CMD5, etc. in Table 4). According to this embodiment, the first argument Arg1 can be configured to carry any of the operating command representatives 0x0000, 0x0001, 0x0010, 0x0011, 0x0100, etc. in Table 4, but the present invention is not limited thereto. For example, any of other arguments among the arguments Arg1, Arg2, Arg3, etc. can be configured to carry an operating command representative when there is a need.

Taking a reading request as an example of an accessing request from the host device 50, assume that:

(1) the operating command CMD1 may represent a Command Latch Enable (CLE) command (which may be referred to as "CLE" for brevity), where one or more subsequent arguments (e.g. a single subsequent argument such as the second argument Arg2) may carry an associated operating command such as a READ MODE command 00h (e.g. 0x00), an ending command 30h (e.g. 0x30) of a command sequence of a READ PAGE command 00h-30h (e.g. {0x00, 0x30}), etc.;

(2) the operating command CMD2 may represent an Address Latch Enable (ALE) command (which may be referred to as "ALE" for brevity), where one or more subsequent arguments (e.g. multiple subsequent arguments such the second and the third arguments Arg2 and Arg3) may carry an associated address having a predetermined number of bytes (e.g. 5 bytes, 6 bytes, etc.);

(3) the operating command CMD3 may represent a Wait-Ready-or-Busy (Wait-RB) command (which may be referred to as "WaitRB" for brevity); and (4) the operating command CMD4 may represent the DMA-Read command, where one or more subsequent arguments (e.g. a single subsequent argument such as the second argument Arg2) may carry an associated sector count having a predetermined number of bytes (e.g. one or more bytes); but the present invention is not limited thereto. In some embodiments, the meanings of the operating commands CMD1, CMD2, CMD3, CMD4, CMD5, etc. in Table 4 and the information carried by the associated subsequent arguments (e.g. the arguments Arg2, Arg3, etc.) may vary.

As the command mapping table 56T can store multiple command mapping relationships between the operating commands CMD1, CMD2, CMD3, CMD4, CMD5, etc. and the operating command representatives 0x0000, 0x0001, 0x0010, 0x0011, 0x0100, etc. as shown in Table 4, the host device 50 (e.g. the processor 52) can perform command mapping according to the command mapping table 56T to obtain any command mapping relationship of the multiple command mapping relationships. For example, the set of operating commands may comprise a series of operating commands listed below:

(1) {CLE, 0x00};
(2) {ALE, 0x0000000100}, where the predetermined number of bytes of the associated address may represent 5 bytes;
(3) {CLE, 0x30};
(4) {WaitRB}; and
(5) {DMA-Read, 0x08}, which may stand for performing a Direct Memory Access (DMA)-read operation to read 8 sectors such as 8 kilobytes (KB), where the predetermined number of bytes of the associated sector count may represent one byte;

but the present invention is not limited thereto. After performing command mapping according to the command mapping table 56T, the host device 50 (e.g. the processor 52) can obtain the set of intermediate commands such as a series of operating command representatives listed below:

(1) {0x0000, 0x00};
(2) {0x0001, 0x0000000100};
(3) {0x0000, 0x30};
(4) {0x0010}; and
(5) {0x0011, 0x08};

but the present invention is not limited thereto. As a result, the host device 50 (e.g. the processor 52) can send the series of operating command representatives with a series of UART commands (e.g. five UART commands) listed below:

(1) {"CI", {0x0000, 0x00000000, 0x00000000, 0x0000, CHECKSUM(1)};
(2) {"CI", {0x0001, 0x0000000000000100, 0x0000, CHECKSUM(2)};
(3) {"CI", {0x0000, 0x00000030, 0x00000000, 0x0000, CHECKSUM(3)};
(4) {"CI", {0x0010, 0x00000000, 0x00000000, 0x0000, CHECKSUM(4)}; and
(5) {"CI", {0x0011, 0x00000008, 0x00000000, 0x0000, CHECKSUM(5)};

where CHECKSUM(1), CHECKSUM(2), . . . , and CHECKSUM(5) may represent the checksums carried by the respective field #6 of this series of UART commands, and the digits printed in italic type as shown above may represent dummy digits, but the present invention is not limited thereto. In some embodiments, the arrangement of the dummy digits and/or the respective values of the dummy digits may vary.

As each of the command mapping tables 116T and 120T can store the multiple command mapping relationships between the operating commands CMD1, CMD2, CMD3, CMD4, CMD5, etc. and the operating command representatives 0x0000, 0x0001, 0x0010, 0x0011, 0x0100, etc. as shown in Table 4, the memory device 100 (e.g. the memory controller 110) can perform command mapping according to any of the command mapping tables 116T and 120T to obtain any command mapping relationship of the multiple command mapping relationships, and more particularly, obtain the set of operating commands such as the series of operating commands mentioned above, and access (e.g. read) the NV memory 120 with the series of operating commands for the host device 50. For brevity, similar descriptions for this embodiment are not repeated in detail here.

According to another embodiment, each dummy digit of the above dummy digits may be replaced with 0xF, and the host device 50 (e.g. the processor 52) can send the series of operating command representatives with another version of the series of UART commands as listed below:

(1) {"CI", {0x0000, 0xFFFFFF00, 0xFFFFFFFF, 0xFFFF, CHECKSUM(1)};
(2) {"CI", {0x0001, 0xFFFFFF0000000100, 0xFFFF, CHECKSUM(2)};
(3) {"CI", {0x0000, 0xFFFFFF30, 0xFFFFFFFF, 0xFFFF, CHECKSUM(3)};
(4) {"CI", {0x0010, 0xFFFFFFFF, 0xFFFFFFFF, 0xFFFF, CHECKSUM(4)}; and
(5) {"CI", {0x0011, 0xFFFFFF08, 0xFFFFFFFF, 0xFFFF, CHECKSUM(5)};

where CHECKSUM(1), CHECKSUM(2), . . . , and CHECKSUM(5) may represent the checksums carried by the respective field #6 of this version of the series of UART commands, and the digits printed in italic type as shown above may represent dummy digits, but the present invention is not limited thereto. For brevity, similar descriptions for this embodiment are not repeated in detail here.

Figure 5:
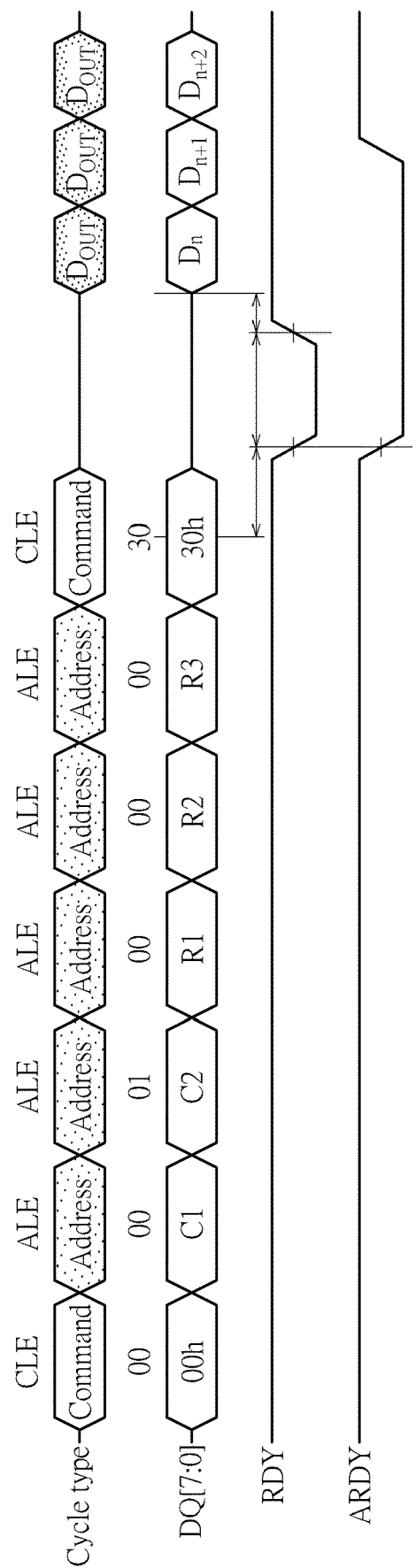
FIG. 5 illustrates some associated signals of a READ PAGE operation corresponding to a READ PAGE command according to an embodiment of the present invention.

FIG. 5 illustrates some associated signals of a READ PAGE operation corresponding to the READ PAGE command 00h-30h (e.g. {0x00, 0x30}) according to an embodiment of the present invention, where the signals DQ[7:0], RDY and ARDY can be taken as examples of a set of signals between the memory controller 110 and the NV memory 120, but the present invention is not limited thereto.

The memory device 100 (e.g. the memory controller 110) can operate as requested by the host device 50, and more particularly, receive the series of UART commands to obtain the series of operating command representatives, perform command mapping according to any of the command mapping tables 116T and 120T to convert the series of operating command representatives into the series of operating commands, and access (e.g. read) the NV memory 120 with the series of operating commands for the host device 50. For better comprehension, the cycle type sequence {CLE, ALE, ALE, ALE, ALE, ALE, CLE} of the cycle type shown in the uppermost of FIG. 5 may indicate some control cycles such as seven consecutive cycles. For example, among the seven consecutive cycles starting from a certain cycle, such as cycles #0, #1, . . . and #6 starting from cycle #0, the memory controller 110 can assert a CLE signal in this set of signals (e.g. set the CLE signal as the enabling state thereof) in cycles #0 and #6 and de-assert the CLE signal (e.g. set the CLE signal as the disabling state thereof) in cycles #1, #2, . . . and #5, and assert an ALE signal in this set of signals (e.g. set the ALE signal as the enabling state thereof) in cycles #1, #2, . . . and #5 and desert the ALE signal (e.g. set the ALE signal as the disabling state thereof) in cycles #0 and #6.

In addition, a byte sequence {00h, C1, C2, R1, R2, R3, 30h} (e.g. seven bytes {0x00, 0x00, 0x01, 0x00, 0x00, 0x00, 0x30}) carried by the signal DQ[7:0] on a bus between the memory controller 110 and the NV memory 120 may represent a command byte 00h indicating the READ MODE command ooh, five address bytes {C1, C2, R1, R2, R3} indicating a read address (e.g. respective bytes {0x00, 0x00, 0x00, 0x01, 0x00} of the associated address 0x0000000100 of the operating command CMD2, transmitted in a reversed order), and a command byte 30h indicating the ending command 30h of the command sequence of the READ PAGE command 00h-30h, where the read address may comprise a column address (e.g. column bytes {C1, C2}) and a row address (e.g. row bytes {R1, R2, R3}), but the present invention is not limited thereto. Afterward, there may be state transitions of the signals RDY and ARDY.

Additionally, a subsequent cycle type sequence {$D_{OUT}$, $D_{OUT}$, $D_{OUT}$, ...} may indicate some data out cycles. In the data out cycles, the memory controller 110 can obtain data bytes $D_n$, $D_{n+1}$, $D_{n+2}$, etc. from the NV memory 120 through the signal DQ[7:0] to prepare the read data for being returned to the host device 50. As a result, the memory device 100 (e.g. the memory controller 110) can return the read data to the host device 50 in response to the reading request. For brevity, similar descriptions for this embodiment are not repeated in detail here.

Figure 6:
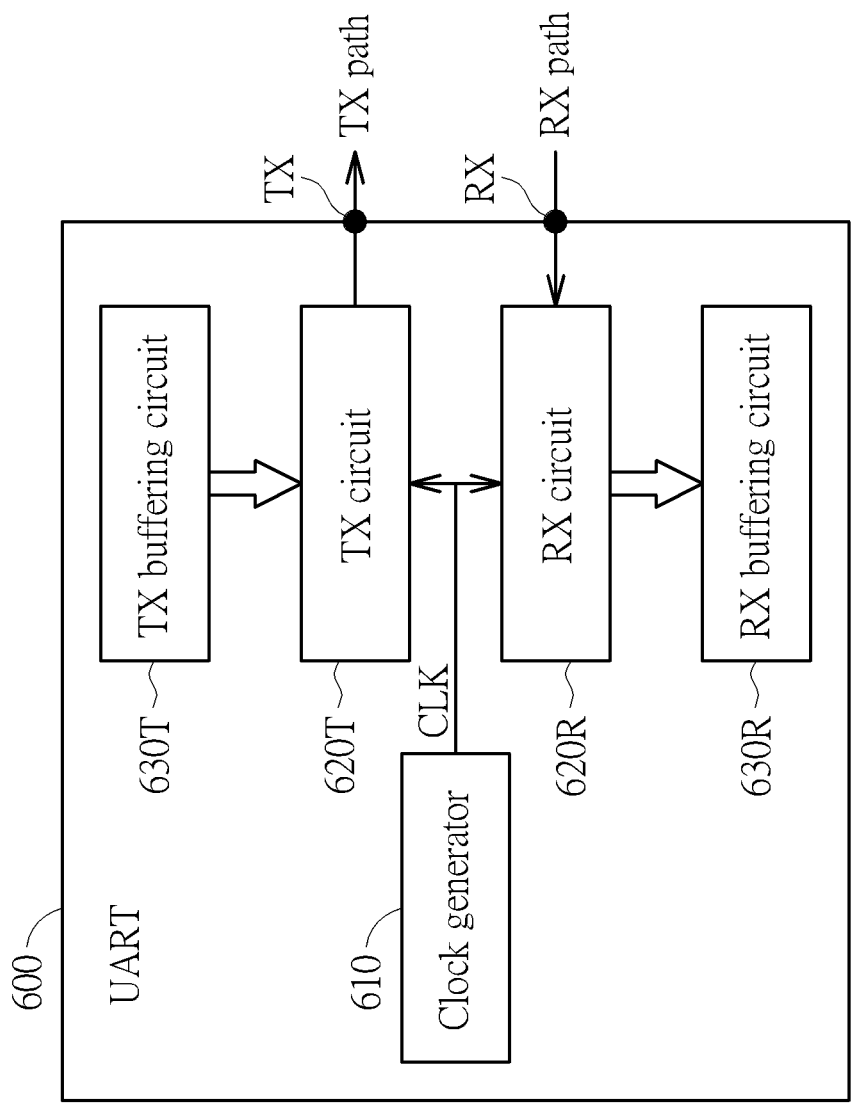
FIG. 6 illustrates an example of a UART in the electronic device.

FIG. 6 illustrates an example of a UART in the electronic device 10, where any UART (e.g. each UART) of the UARTs 58U and 118U can be implemented by way of the architecture of the UART 600 shown in FIG. 6. The UART 600 may comprise a clock generator 610 for generating a clock CLK as a reference for data transmission, a transmitting (TX) circuit 620T coupled to the clock generator, a TX buffering circuit 630T coupled to the TX circuit 620T, a receiving (RX) circuit 620R coupled to the clock generator 610, and a RX buffering circuit 630R coupled to the RX circuit 620R. The TX circuit 620T and the RX circuit 620R can be implemented by way of shift registers, etc., and the TX buffering circuit 630T and the RX buffering circuit 630R can be implemented by way of registers, etc., but the present invention is not limited thereto. In addition, the RX path and the TX path may represent at least one portion of the connections between the set of terminals {RX, TX, GND} of the UART 118U and the set of terminals {TX, RX, GND} of the UART 58U, such as two connections between the set of terminals {RX, TX} of the UART 118U and the set of terminals {TX, RX} of the UART 58U. For brevity, similar descriptions for this embodiment are not repeated in detail here.

Figure 7:
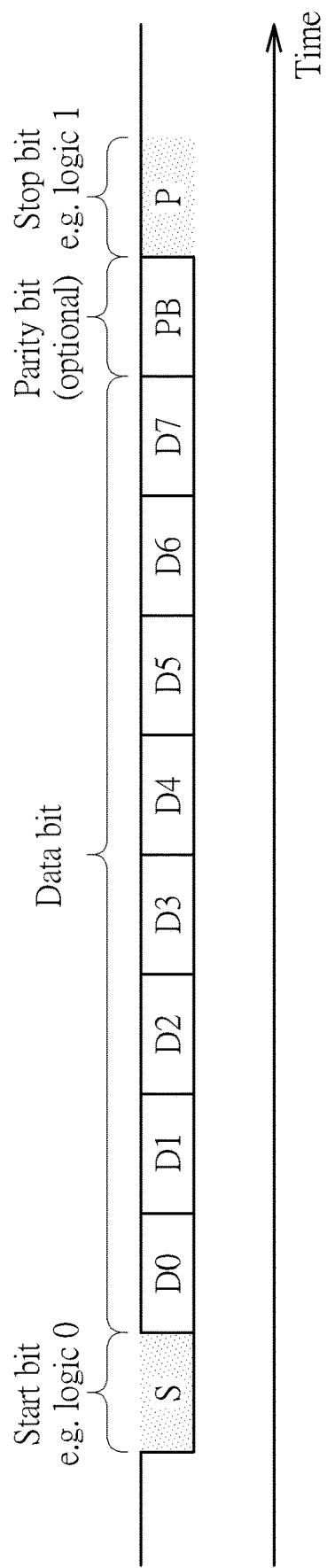
FIG. 7 illustrates an example of a byte transmission format of the UART connection.

FIG. 7 illustrates an example of a byte transmission format of the UART connection, where the horizontal axis may represent time. A first UART among the UARTs 58U and 118U can send a byte comprising data bits {D0, D1, ..., D7}, such as any byte (e.g. each byte) of all bytes of the UART command, to a second UART among the UARTs 58U and 118U according to the byte transmission format, and the second UART can receive the byte comprising data bits {D0, D1, ..., D7} according to the byte transmission format. Before sending this byte, the first UART can send a start bit S (e.g. logic 0). After sending this byte, the first UART can selectively send a parity bit PB (labeled "optional" for better comprehension) and a stop bit P (e.g. logic 1). For brevity, similar descriptions for this embodiment are not repeated in detail here.

According to some embodiments, a Universal Flash Storage (UFS) initialization procedure may comprise a series of processing. For example, this series of processing may comprise:
(1) M-PHY layer initialization on both sides (e.g. UFS Host side and UFS Device side);
(2) UniPro Boot Sequence and Attributes Configuration;
(3) UTP Verify;
(4) Check Boot Enabled;
(5) Check Boot Logical Unit (LU) Ready;
(6) Read Boot Data;
(7) Set Flag; and
(8) Poll Flag;

but the present invention is not limited thereto. Please note that the UFS initialization procedure is very complicated. In comparison with this, the UART communications based on the new protocol provided by the present invention can be very useful in the any phase of the memory device 100. For example, in a situation where the memory device 100 is designed to support the UFS initialization procedure, the UFS initialization procedure is typically workable in the mass production phase and/or the user phase (e.g. the phase where the user owns a product such as the memory device 100) of the memory device 100, but may be unavailable in the preliminary phase (e.g. the design phase) of the memory device 100. No matter whether it is in the mass production phase or the user phase or in the preliminary phase (e.g. the design phase) of the memory device 100, the UART communications based on the new protocol provided by the present invention can be used when there is a need. For brevity, similar descriptions for these embodiments are not repeated in detail here.

According to some embodiments, a UFS Protocol Information Unit (UPIU) may comprise a plurality of fields, and may need associated processing regarding the plurality of fields, for properly setting these fields to guarantee correct control. Example of the plurality of fields may include, but are not limited to:
(1) Transaction Type;
(2) Flags;
(3) Logic Unit Number (LUN);
(4) Task Tag;
(5) Command Set Type;
(6) Query Function and/or Task Management Function;
(7) Response;
(8) Status;
(9) Total Extra Header Segment (EHS) Length;
(10) Device Information;
(11) Data Segment Length;
(12) Transaction Specific Fields;
(13) Extra Header Segment (EHS) Fields;
(14) Header E2ECRC;
(15) Data Segment; and
(16) Data E2ECRC;

but the present invention is not limited thereto. Please note that the UPIU-related processing is very complicated. In comparison with this, the UART communications based on the new protocol provided by the present invention can be very useful in the any phase of the memory device 100. For example, in a situation where the memory device 100 is designed to support the UPIU-related processing, the UPIU-related processing is typically workable in the mass production phase and/or the user phase (e.g. the phase where the user owns a product such as the memory device 100) of the memory device 100, but may be unavailable in the preliminary phase (e.g. the design phase) of the memory device 100. No matter whether it is in the mass production phase or the user phase or in the preliminary phase (e.g. the design phase) of the memory device 100, the UART communications based on the new protocol provided by the present invention can be used when there is a need. For brevity, similar descriptions for these embodiments are not repeated in detail here.

According to some embodiments, if the memory device 100 malfunctions in the user phase, the user may send the memory device 100 back to a certain division (e.g. a service division) of the manufacturer of the memory device 100 to ask for repairing the memory device 100, and the UART communications based on the new protocol provided by the present invention may be helpful on testing the memory device 100, obtaining user data for the user, etc. in this division of the manufacturer. For brevity, similar descriptions for these embodiments are not repeated in detail here.

Figure 8:
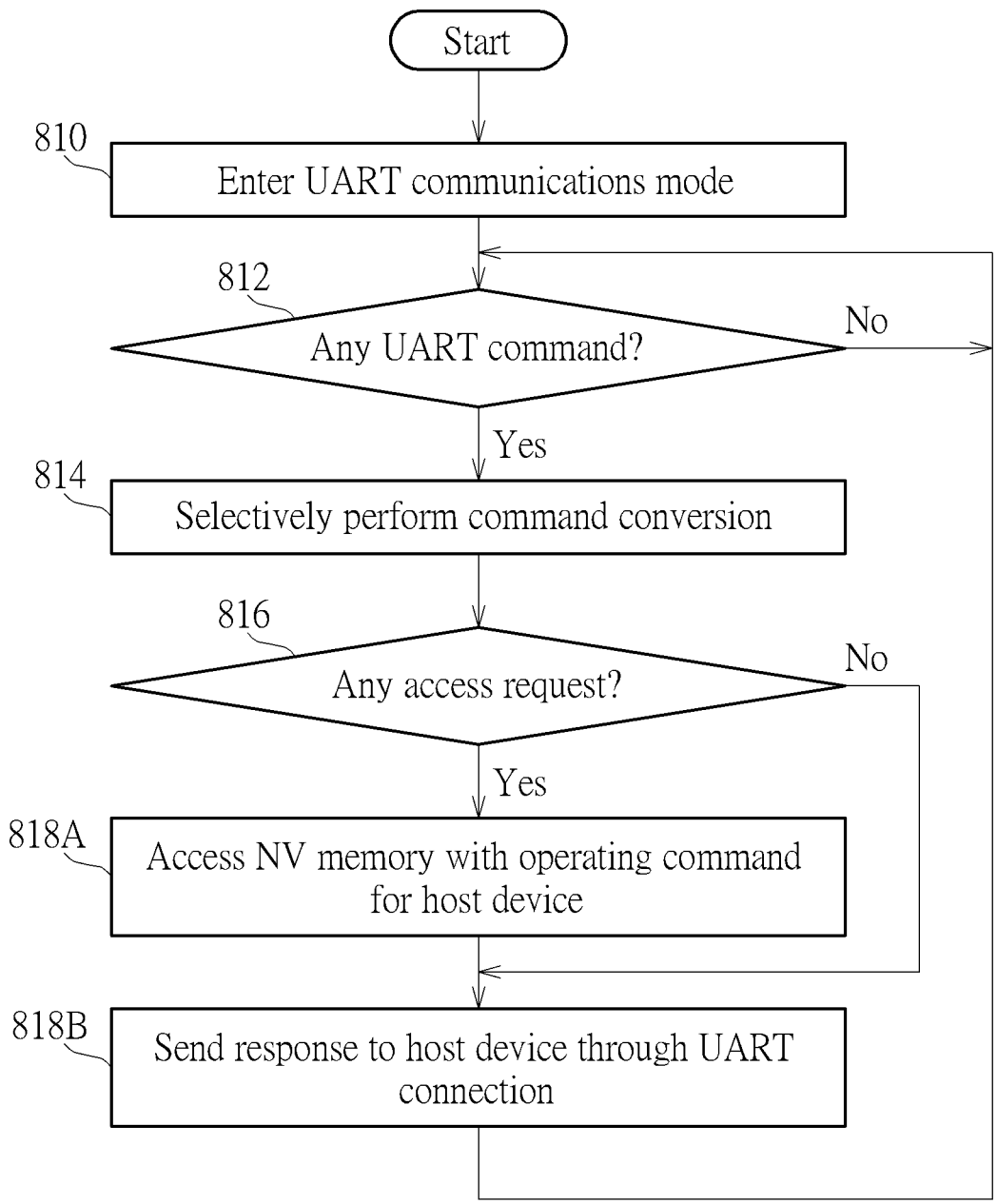
FIG. 8 is a flowchart of the method for performing access management of the memory device with aid of the UART connection according to an embodiment of the present invention.

FIG. 8 is a flowchart of the method for performing access management of the memory device with aid of the UART connection according to an embodiment of the present invention. For better comprehension, the host device 50 is capable of sending a host command among the plurality of host commands to the memory device 100 according to an existing protocol (e.g. a certain protocol of the specific communications specification) for accessing the memory device 100, and the memory device 100 (e.g. the memory controller 110 therein) is capable of receiving and recognizing the host command among the plurality of host commands from the host device 50 according to the existing protocol for accessing the NV memory 120 for the host device 50. In addition, the memory device 100 (e.g. the memory controller 110 therein) can perform communications with the host device 50 through the UART connection according to the UART protocol. More particularly, the UART protocol is different from the existing protocol. For example, in a situation where the set of terminals {RX, TX, GND} of the UART 118U are respectively coupled to the set of terminals {TX, RX, GND} of the UART 58U to form the UART connection between the memory device 100 (e.g. the memory controller 110 therein) and the host device 50, the memory device 100 (e.g. the memory controller 110) can operate according to the working flow shown in FIG. 8.

In Step 810, when the UART 118U of the memory controller 110 is connected to the UART 58U of the host device 50 (e.g. the set of terminals {RX, TX, GND} of the UART 118U are respectively coupled to the set of terminals {TX, RX, GND} of the UART 58U), the memory device 100 (e.g. the memory controller 110) can enter a UART communications mode to perform the UART communications, and more particularly, to start performing communications with the host device 50 through the UART connection according to the UART protocol.

In Step 812, the memory device 100 (e.g. the memory controller 110) can check whether any UART command is received from the host device 50. If Yes, Step 814 is entered; if No Step 812 is re-entered.

In Step 814, the memory device 100 (e.g. the memory controller 110) can selectively perform command conversion, and more particularly, can convert the any UART command such as an intermediate command into an operating command when the command conversion is applicable to the any UART command.

In Step 816, according to one or more latest UART commands received from the host device 50, the memory device 100 (e.g. the memory controller 110) can check whether any access request exists. If Yes, Step 818A is entered; if No Step 818B is re-entered. For better comprehension, the memory device 100 (e.g. the memory controller 110) may have convert the one or more latest UART commands into a set of operating commands (e.g. the set of operating commands mentioned in one or more of the above embodiments), for example, by performing the operation of Step 814 one or more times with respect to the one or more latest UART commands, where the set of operating commands may indicate that the any access request exists.

In Step 818A, the memory device 100 (e.g. the memory controller 110) can access the NV memory 120 with the set of operating commands such as the one or more operating commands for the host device 50.

In Step 818B, the memory device 100 (e.g. the memory controller 110) can send a response to the host device 50 through the UART connection.

More particularly, the one or more latest UART commands may represent the set of intermediate commands such as the one or more operating command representatives, and the set of intermediate commands may correspond to the set of operating commands, since any set of commands among the two sets of commands (i.e. the set of intermediate commands and the set of operating commands) may be convert into the other set of commands among the two sets of commands. Before sending the set of intermediate commands to the memory controller 110 through the UART connection to notify the memory controller 110 of the any access request, the host device 50 can convert the set of operating commands into the set of intermediate commands. In addition, the memory device 100 (e.g. the memory controller 110) can utilize the UART 118U of the memory controller 110 to receive the set of intermediate commands corresponding to the set of operating commands, such as the one or more operating command representatives, through the UART connection between the memory device 100 and the host device 50, and can convert the set of intermediate commands into the set of operating commands according to a command mapping table (e.g. any of the command mapping tables 116T and 120T) positioned within the memory device 100. For brevity, similar descriptions for this embodiment are not repeated in detail here.

For better comprehension, the method may be illustrated with the working flow shown in FIG. 8, but the present invention is not limited thereto. According to some embodiments, one or more steps may be added, deleted, or changed in the working flow shown in FIG. 8.

According to some embodiments, the set of operating commands may comprise the one or more operating commands for being used by the memory controller 110 to directly control the NV memory 120, and the set of intermediate commands may comprise the one or more operating command representatives for being used as one or more representatives of the one or more operating command. For brevity, similar descriptions for these embodiments are not repeated in detail here.

According to some embodiments, the memory device 100 (e.g. the memory controller 110) can utilize the UART 118U of the memory controller 110 to operate according to the UART protocol, for providing a basic communications capability (e.g. the communications capability of the UART communications in the architecture as described in one or more of the above embodiments) to make the NV memory 120 be accessible from outside of the memory device 100 through the UART connection in any phase of multiple possible phases of the memory device 100. For better comprehension, the multiple possible phases may represent the aforementioned various phases of the memory device 100, and therefore may comprise the mass production phase and at least one preliminary phase (e.g. one or more preliminary phases, such as the design phase and/or any of the multiple pilot run phases) prior to the mass production phase. For example, the UART 118U of the memory controller 110 can operate according to the UART protocol, making the NV memory 120 be accessible from outside of the memory device 100 through the UART connection in the mass production phase. For another example, the UART 118U of the memory controller 110 can operate according to the UART protocol, making the NV memory 120 be accessible from outside of the memory device 100 through the UART connection in the aforementioned at least one preliminary phase. For brevity, similar descriptions for these embodiments are not repeated in detail here.

According to some embodiments, the communications speed of the UART connection can be the minimum speed of at least one speed of at least one available connection between the memory device 100 and the host device 50. For better comprehension, the aforementioned at least one available connection may comprise any type of connection that the memory device 100 (e.g. the memory controller 110 therein) and the host device 50 are capable of establishing between the transmission interface circuits 118 and 58. For example, the transmission interface circuits 118 and 58 can communicate with each other according to the existing protocol (e.g. the aforementioned protocol of the specific communications specification) in some phases (e.g. one or more pilot run phases, the mass production phase and/or the user phase), and can utilize the UARTs 118U and 58U to communicate with each other according to the UART protocol in these phases. In this situation, the aforementioned at least one available connection may comprise an existing-protocol-based connection (e.g. the connection based on the existing protocol, such as any of the connections respectively corresponding to the SATA specification, the USB specification, the PCIE specification, etc.) and the UART connection. Although the communications speed of the UART connection may be much less than that of the existing-protocol-based connection, the UART connection can be utilized as a backup connection when there is a need. For another example, when one or more partial circuits within the memory device 100 malfunction, the transmission interface circuits 118 and 58 cannot communicate with each other according to the existing protocol in these phases due to the one or more partial circuits, but can utilize the UARTs 118U and 58U to communicate with each other according to the UART protocol in these phases. In this situation, the aforementioned at least one available connection may comprise a single available connection such as the UART connection. Among all speed of the aforementioned at least one available connection, the communications speed of the UART connection can be the minimum speed and can also be the maximum speed, since the UART connection is the only connection. For yet another example, one or more partial circuits within the memory device 100 may have not been designed or properly implemented in the preliminary phase such as the design phase. In this situation, the aforementioned at least one available connection may comprise a single available connection such as the UART connection. Similarly, the communications speed of the UART connection can be the minimum speed and can also be the maximum speed. For brevity, similar descriptions for these embodiments are not repeated in detail here.

According to some embodiments, the UART communications can be applied to changing or updating the control mechanism of the memory device 100. For example, during accessing the NV memory 120 with the set of operating commands for the host device 50 in Step 818A, the memory device 100 (e.g. the memory controller 110) can write at least one portion (e.g. a portion or all) of an in-system programming (ISP) code into the NV memory 120 for further controlling the memory device 100. When the total size of the ISP code is small enough to be completely put into a single payload packet in the UART communications (e.g. the total data amount of the ISP code is less than or equal to the byte count 512 of the field #1 in the basic format of the single UART payload as illustrated in Table 3), it is sufficient to execute Step 818A one time to completely writing the ISP code into the NV memory 120; otherwise, it is required to execute Step 818A, as well as a loop comprising Steps 812, 814, 816, 818A and 818B, multiple times to completely writing the ISP code into the NV memory 120. For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing access management of a memory device with aid of a Universal Asynchronous Receiver-Transmitter (UART) connection, the method being applied to a memory controller of the memory device, the memory device comprising the memory controller and a non-volatile (NV) memory, the NV memory comprising at least one NV memory element, the method comprising:
   utilizing a UART of the memory controller to receive a set of intermediate commands corresponding to a set of operating commands through the UART connection between the memory device and a host device, wherein before sending the set of intermediate commands to the controller through the UART connection, the host device converts the set of operating commands into the set of intermediate commands;
   converting the set of intermediate commands into the set of operating commands according to a command mapping table, wherein the command mapping table is positioned within the memory device; and
   accessing the NV memory with the set of operating commands for the host device, and sending a response to the host device through the UART connection.

2. The method of claim 1, wherein the set of operating commands comprises one or more operating commands for being used by the memory controller to directly control the NV memory; and the set of intermediate commands comprises one or more operating command representatives for being used as one or more representatives of the one or more operating command.

3. The method of claim 1, wherein the host device is capable of sending a host command among a plurality of host commands to the memory device according to an existing protocol for accessing the memory device; and the memory device performs communications with the host device through the UART connection according to a UART protocol.

4. The method of claim 3, wherein the UART protocol is different from the existing protocol.

5. The method of claim 1, further comprising:
   in response to the UART of the memory controller being connected to a corresponding UART of the host device, starting performing communications with the host device through the UART connection according to a UART protocol.

6. The method of claim 1, further comprising:
   utilizing the UART of the memory controller to operate according to a UART protocol, for providing a basic communications capability to make the NV memory be accessible from outside of the memory device through the UART connection.

7. The method of claim 6, wherein the UART of the memory controller operates according to the UART protocol, making the NV memory be accessible from outside of the memory device through the UART connection in a mass production phase of the memory device.

8. The method of claim 6, wherein the UART of the memory controller operates according to the UART protocol, making the NV memory be accessible from outside of the memory device through the UART connection in at least one preliminary phase prior to a mass production phase of the memory device.

9. The method of claim 1, wherein a communications speed of the UART connection is a minimum speed of at least one speed of at least one available connection between the memory device and the host device.

10. The method of claim 1, wherein accessing the NV memory with the set of operating commands for the host device further comprises:
   writing at least one portion of an in-system programming (ISP) code into the NV memory for further controlling the memory device.

11. A memory device, comprising:
   a non-volatile (NV) memory, arranged to store information, wherein the NV memory comprises at least one NV memory element; and
   a controller, coupled to the NV memory, arranged to control operations of the memory device, wherein the controller comprises:
      a processing circuit, arranged to control the controller according to a plurality of host commands from a host device, to allow the host device to access the NV memory through the controller; and
      a transmission interface circuit, arranged to perform communications with the host device, wherein the transmission interface circuit comprises:
         a Universal Asynchronous Receiver-Transmitter (UART), wherein the UART is equipped with a set of terminals for being respectively coupled to a set of terminals of a corresponding UART of the host device to form a UART connection between the memory device and the host device;
   wherein:
      the controller utilizes the UART thereof to receive a set of intermediate commands corresponding to a set of operating commands through the UART connection, wherein before sending the set of intermediate commands to the controller through the UART connection, the host device converts the set of operating commands into the set of intermediate commands;
      the controller converts the set of intermediate commands into the set of operating commands according to a command mapping table, wherein the command mapping table is positioned within the memory device; and
      the controller accesses the NV memory with the set of operating commands for the host device, and sends a response to the host device through the UART connection.

12. An electronic device comprising the memory device of claim 11, and further comprising:
   the host device, coupled to the memory device, wherein the host device comprises:
      at least one processor, arranged for controlling operations of the host device; and
      a power supply circuit, coupled to the at least one processor, arranged for providing power to the at least one processor and the memory device;
   wherein the memory device provides the host device with storage space.

13. A controller of a memory device, the memory device comprising the controller and a non-volatile (NV) memory, the NV memory comprising at least one NV memory element, the controller comprising:
   a processing circuit, arranged to control the controller according to a plurality of host commands from a host device, to allow the host device to access the NV memory through the controller; and
   a transmission interface circuit, arranged to perform communications with the host device, wherein the transmission interface circuit comprises:
      a Universal Asynchronous Receiver-Transmitter (UART), wherein the UART is equipped with a set of terminals for being respectively coupled to a set of terminals of a corresponding UART of the host device to form a UART connection between the memory device and the host device;
   wherein:
      the controller utilizes the UART thereof to receive a set of intermediate commands corresponding to a set of operating commands through the UART connection, wherein before sending the set of intermediate commands to the controller through the UART connection, the host device converts the set of operating commands into the set of intermediate commands;
      the controller converts the set of intermediate commands into the set of operating commands according to a command mapping table, wherein the command mapping table is positioned within the memory device; and
      the controller accesses the NV memory with the set of operating commands for the host device, and sends a response to the host device through the UART connection.

* * * * *